(12) United States Patent
Tsai

(10) Patent No.: US 6,592,219 B1
(45) Date of Patent: Jul. 15, 2003

(54) CLAMPING TOOL FOR USE IN THE MAINTENANCE OF FRAMELESS EYEGLASSES

(75) Inventor: Allan Tsai, Taipei (TW)

(73) Assignee: Prosben, Inc., Taipei (TW)

( * ) Notice: Subject to any disclaimer, the term of this patent is extended or adjusted under 35 U.S.C. 154(b) by 0 days.

(21) Appl. No.: 10/202,199

(22) Filed: Jul. 24, 2002

(51) Int. Cl.$^7$ .................................................. G02C 13/00
(52) U.S. Cl. ........................................... 351/42; 351/41
(58) Field of Search .......................... 351/42, 41, 158, 351/110

(56) References Cited

U.S. PATENT DOCUMENTS 6,145,982 A * 11/2000 Hudspeth et al. ............. 351/42

* cited by examiner

*Primary Examiner*—Hung Xuan Dang
(74) *Attorney, Agent, or Firm*—Trop, Pruner & Hu, P.C.

(57) ABSTRACT

A clamping tool includes a clamping member with a tubular body and resilient clamping jaws extending integrally from the tubular body and cooperatively defining a clamping hole. The clamping jaws have inclined outer surfaces which incline radially and outwardly in a direction away from the tubular body. An adjustment sleeve is sleeved on the tubular body, and has a depressing section disposed proximate to the clamping jaws, and a threaded section that is formed with an internal screw thread which engages an external screw thread on an outer surface of the tubular body. Due to the engagement between the internal screw thread and the external screw thread, the depressing section is moved along the inclined outer surfaces of the clamping jaws, and depresses the clamping jaws to permit adjustment of size of the clamping hole when the adjustment sleeve is rotated about the clamping member.

11 Claims, 2 Drawing Sheets

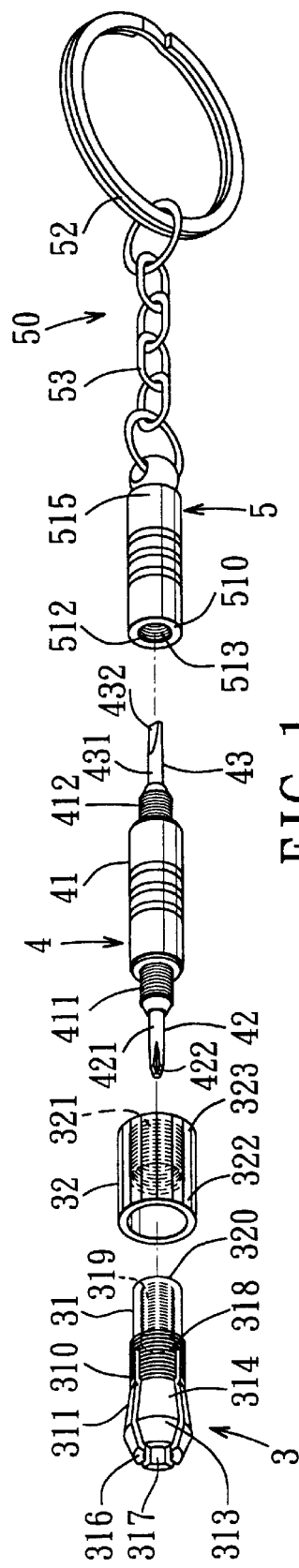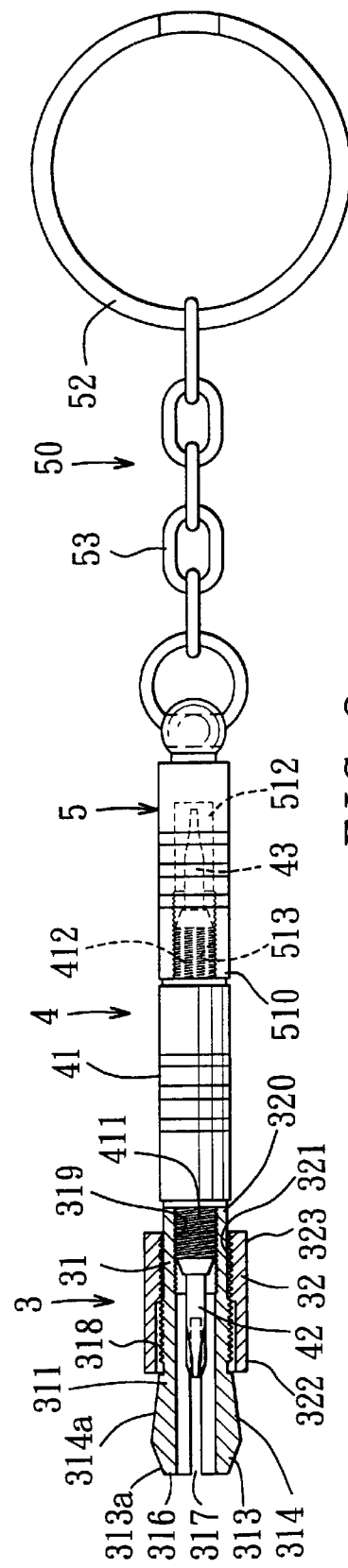

CLAMPING TOOL FOR USE IN THE MAINTENANCE OF FRAMELESS EYEGLASSES

BACKGROUND OF THE INVENTION

1. Field of the Invention

The present invention relates to a clamping tool with an adjustable clamping hole, more particularly to a clamping tool suitable for use in the maintenance of frameless eyeglasses.

2. Description of the Related Art

In frameless eyeglasses, each of a pair of temples has a front end fastened to a respective lens by means of a screw and a nut. The screw and the nut are relatively small in size, and cannot be operated by a clamping tool or a screwdriver of an ordinary size. There is a need for a tool, such as a clamping tool, that is suitable for operating small-size nuts and screws in the maintenance of frameless eyeglasses.

SUMMARY OF THE INVENTION

Therefore, the main object of the present invention is to provide a clamping tool with an adjustable clamping hole and suitable for use in the maintenance of frameless eyeglasses.

Accordingly, the clamping tool of the present invention includes a clamping member and an adjustment sleeve. The clamping member includes a tubular body which has a first end, a second end opposite to the first end, and an outer surface formed with an external screw thread. The clamping member further includes a plurality of resilient clamping jaws which are arranged around an axis of the tubular body and which extend axially and integrally from the first end of the tubular body. Each of the clamping jaws includes a first section connected to the first end of the tubular body and having an inclined outer surface which inclines radially and outwardly in a.direction away from the tubular body. Each of the clamping jaws further includes a second section extending from the first section and having a distal end. The distal ends of the clamping jaws cooperatively define a clamping hole thereamong. The adjustment sleeve is sleeved on the tubular body. The adjustment sleeve has a depressing section disposed proximate to the clamping jaws, and a threaded section connected to the depressing section and disposed proximate to the second end of the tubular body. The threaded section has an inner surface formed with an internal screw thread which engages the external screw thread on the outer surface of the tubular body. The adjustment sleeve is operable for rotating about the clamping member so as to be moved along the clamping member toward and away from the clamping jaws by virtue of threaded engagement between the internal screw thread of the adjustment sleeve and the external screw thread of the clamping member. The depressing section is movable along the inclined outer surfaces of the clamping jaws, and depresses the clamping jaws to permit adjustment of size of the clamping hole when the adjustment sleeve is rotated about the clamping member.

BRIEF DESCRIPTION OF THE DRAWINGS

Other features and advantages of the present invention will become apparent in the following detailed description of the preferred embodiments with reference to the accompanying drawings, of which:

FIG. 1 is an exploded perspective view illustrating a first preferred embodiment of the clamping tool according to the present invention;

FIG. 2 is a partly-sectional view of the first preferred embodiment;

DETAILED DESCRIPTION OF THE PREFERRED EMBODIMENTS

Figure 3:
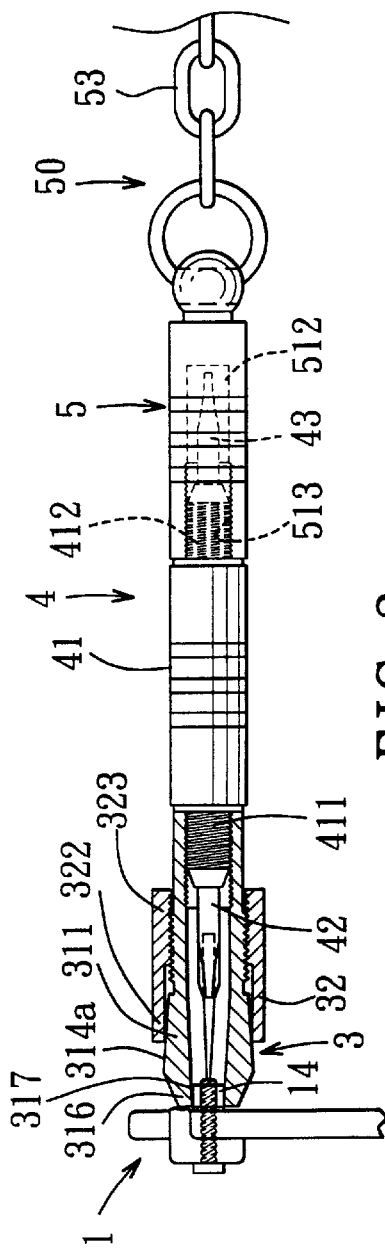
FIG. 3 is another partly-sectional view of the preferred embodiment when used for operating a nut on frameless eyeglasses.

Referring to FIGS. 1 and 2, the preferred embodiment of the clamping tool according to the present invention is shown to include a clamping member 3, an adjustment sleeve 32, a screwdriver member 4, a tubular container member 5, and a key ring 50.

The clamping member 3 includes a tubular body 31 and a plurality of resilient clamping jaws 311 extending from the tubular body 31. The tubular body 31 has a first end 310, an open second end 320 opposite to the first end 310, an outer surface formed with an external screw thread 318 adjacent to the first end 310, and an inner surface formed with an internal screw thread 319 adjacent to the second end 320. The clamping jaws 311 are arranged around an axis of the tubular body 31, and are angularly displaced from one another with respect to the axis of the tubular body 31. The clamping jaws 311 extend integrally and axially from the first end 310 of the tubular body 310. Each of the clamping jaws 311 has a first section 314 connected to the first end 310 of the tubular body 31, and a second section 313 which extends from the first section 314 and which has a distal end 316 opposite to the second end 320 of the tubular body 31. The distal ends 316 of the clamping jaws 311 cooperatively define a clamping hole 317 thereamong. The clamping hole 317 may be circular or hexagonal in shape, depending on the number and configuration of the clamping jaws 311. The first section 314 of each of the clamping jaws 311 has a first inclined outer surface 314a which inclines radially and outwardly in a direction away from the tubular body 31. The second section 313 has a second inclined outer surface 313a which inclines radially and inwardly in a direction toward the distal end 316 thereof.

The adjustment sleeve 32 is sleeved on the tubular body 31, and includes a depressing section 322 disposed proximate to the clamping jaws 311, and a threaded section 323 connected to the depressing section 322 and disposed proximate to the second end 320 of the tubular body 31. The threaded section 323 has an inner surface formed with;an internal screw thread 321 which engages the external screw thread 318 on the tubular body 31 of the clamping member 3. The adjustment sleeve 32 is operable for rotating about the clamping member 3 so as to be moved along the clamping member 3 toward and away from the clamping jaws 311 by virtue of threaded engagement between the internal screw thread 321 of the adjustment sleeve 32 and the external screw thread 318 of the clamping member 3. Referring to FIGS. 2 and 3, when the adjustment sleeve 32 is moved toward the distal ends 316 of the clamping jaws 311, the depressing section 322 gradually depresses the first inclined outer surfaces 314a of the clamping jaws 311 to cause the distal ends 316 of the clamping jaws 311 to move close to one another, thereby contracting the clamping hole 317 to suit the size of a specific nut 14 on frameless eyeglasses 1. On the other hand, when it is desired to enlarge the clamping hole 317 to suit the size of another nut, the adjustment sleeve 32 is rotated in an opposite direction for moving away from the clamping jaws 311. In this manner, the size of the clamping hole 317 can be easily adjusted. Moreover, the provision of the adjustment sleeve 32 enables the clamping jaws 311 to grasp the nut 14 more tightly and securely to facilitate operation of the nut 14.

Referring back to FIGS. 1 and 2, the screwdriver member 4 includes an elongated, rigid, and cylindrical main body 41 with a first end formed with a first mounting section 411, and a second end opposite to the first end and formed with a second mounting section 412. Each of the first and second mounting sections 411, 412 is reduced in cross-section relative to the main body 41, and has an outer surface formed with an external screw thread. A first driving portion 42 extends co-axially from the first mounting section 411, and has a shank portion 421 and a first driving tip 422 formed on a distal end of the shank portion 421. The first driving tip 422 is a Phillips head tip in the present embodiment. A second driving portion 43 extends coaxially from the second mounting section 412, and has a shank portion 431 and a second driving tip 432 formed on a distal end of the shank portion 431. The second driving tip 432 is a flat tip in the present embodiment. The first driving portion 42 and the first mounting section 411 are extendible into the tubular body 31 of the clamping member 3 via the open second end 320 of the tubular body 31. The first mounting section 411 engages threadedly the internal screw thread 319 of the tubular body 31 for connecting removably to the clamping member 3, thereby disposing the first driving portion 42 in the tubular body 31.

The container member 5 is tubular in shape, and has an open first end 510, and a second end 515 opposite to the first end 510. The container member 5 confines a receiving space 512 that opens at the first end 510, and has an inner surface formed with an internal screw thread 513 adjacent to the first end 510 thereof. The second mounting section 412 and the second driving portion 43 of the screwdriver member 4 are extendible into the container member 5 via the open first end 510. The second mounting section 412 engages threadedly the internal screw thread 513 of the container member 5 for connecting removably to the container member 5, thereby disposing the second driving portion 43 in the receiving space 512 of the container member 5. The key ring 50 includes a ring member 52 and a chain section 53 which is connected to the second end 515 of the container member 5 such that the clamping tool can be conveniently carried by a user.

Figure 4:
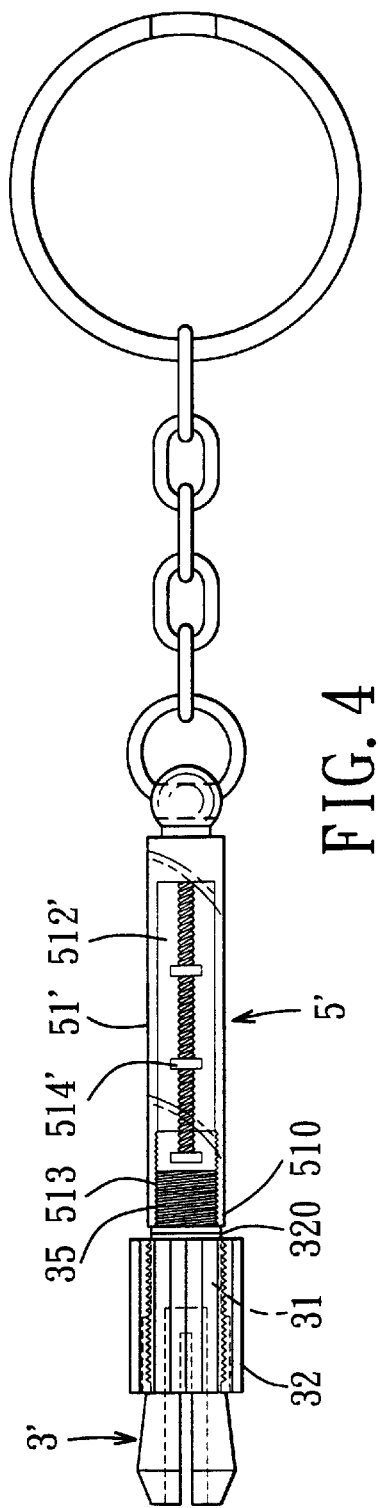
FIG. 4 illustrates a second preferred embodiment of the clamping tool according to the present invention.

Referring to FIG. 4, in a second preferred embodiment of the clamping tool according to the present invention, the screwdriver member 4 is dispensed with, and the clamping member 3' is connected removably to the container member 5'. The clamping member 3' further has an externally threaded mounting shaft 35 which extends from the second end 320 of the tubular body 31. The mounting shaft 35 is extendible into the first, end 510 of the container member 5' for engaging the internal screw thread 513 of the container member 5' so as to connect the container member 5' removably with the clamping member 3'. The container member 5' includes a transparent tubular casing 51' to permit inspection of articles, such as screws 514', received in the receiving space 512' thereof.

An alternative embodiment of the clamping tool according to the present invention includes only a clamping member 3, an adjustment sleeve 32, and a screwdriver member. The container member 5 is dispensed with, and the screwdriver member is not formed with the second mounting section 412 and the second driving portion 43.

In another alternative embodiment of the clamping tool according to the present invention, the screwdriver member 4 and the container member 5 are dispensed with. The key ring 50 is connected to the second end 320 of the tubular body 31 of the clamping member 3.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A clamping tool comprising:

a clamping member including a tubular body which has a first end, a second end opposite to said first end, and an outer surface formed with an external screw thread, said clamping member further including a plurality of resilient clamping jaws which are arranged around an axis of said tubular body and which extend axially and integrally from said first end of said tubular body, each of said clamping jaws including a first section connected to said first end of said tubular body and having an inclined outer surface which inclines radially and outwardly in a direction away from said tubular body, each of said clamping jaws further including a second section extending from said first section and having a distal end, said distal ends of said clamping jaws cooperatively defining a clamping hole thereamong; and an adjustment sleeve sleeved on said tubular body, said adjustment sleeve having a depressing section disposed proximate to said clamping jaws and a threaded section connected to said depressing section and disposed proximate to said second end of said tubular body, said threaded section having an inner surface formed with an internal screw thread which engages said external screw thread on said outer surface of said tubular body, said adjustment sleeve being operable for rotating about said clamping member so as to be moved along said clamping member toward and away from said clamping jaws by virtue of threaded engagement between said internal screw thread of said adjustment sleeve and said external screw thread of said clamping member, said depressing section being movable along said inclined outer surfaces of said clamping jaws and depressing said clamping jaws to permit adjustment of size of said clamping hole when said adjustment sleeve is rotated about said clamping member.

2. The clamping tool as claimed in claim 1, wherein said second section of each of said clamping jaws has an inclined outer surface that inclines radially and inwardly in a direction toward said distal end.

3. The clamping tool as claimed in claim 1, further comprising a screwdriver member which includes an elongated main body with opposite first and second ends, and a first driving portion that extends from said first end of said main body and that is formed with a first driving tip, said first end of said main body being connected removably to said second end of said tubular body of said clamping member, said first driving portion being extendible into said second end of said tubular body of said clamping member and being received in said tubular body when said screwdriver member is connected to said clamping member.

4. The clamping tool as claimed in claim 3, wherein said tubular body further has an inner surface formed with an internal screw thread adjacent to said second end of said tubular body, said main body of said screwdriver member having an externally threaded first mounting section on said first end, said first mounting section extending into said second end of said tubular body of said clamping member and engaging threadedly said tubular body of said clamping member.

5. The clamping tool as claimed in claim 3, wherein said screwdriver member further includes a second driving portion which extends from said second end of said main body and opposite to said first driving portion and which is formed with a second driving tip.

6. The clamping tool as claimed in claim 5, wherein said second driving tip has a configuration different from that of said first driving tip.

7. The clamping tool as claimed in claim 6, further comprising a tubular container member with an open first end which is connected removably to said second end of said screwdriver member, and a second end opposite to said first end of said container member, said container member confining a receiving space therein, said second driving portion of said screwdriver member being received in said receiving space when said container member is connected to said screwdriver member.

8. The clamping tool as claimed in claim 7, wherein said container member has an inner surface formed with an internal screw thread adjacent to said first end of said container member, said main body of said screwdriver member having an externally threaded second mounting section on said second end, said second mounting section extending into said first end of said container member and engaging threadedly said container member.

9. The clamping tool as claimed in claim 8, further comprising a key ring connected to said second end of said container member.

10. The clamping tool as claimed in claim 1, further comprising a tubular container member with an open first end which is connected removably to said second end of said tubular body of said clamping member.

11. The clamping tool as claimed in claim 10, wherein said clamping member further has an externally threaded mounting shaft which extends from said second end of said tubular body and which extends into said first end of said container member, said container member having an inner surface formed with an internal screw thread adjacent to said first end of said container member for engaging threadedly said mounting shaft so as to be connected removably to said second end of said tubular body of said clamping member.

\* \* \* \* \*